United States Patent
Aniya

(10) Patent No.: US 9,434,637 B2
(45) Date of Patent: Sep. 6, 2016

(54) OPTICAL GLASS, HOT-MOLDED ARTICLE AND METHOD OF MANUFACTURING THE SAME, OPTICAL ELEMENT AND METHOD OF MANUFACTURING THE SAME

(71) Applicant: HOYA CORPORATION, Tokyo (JP)

(72) Inventor: Masanori Aniya, Tokyo (JP)

(73) Assignee: HOYA CORPORATION, Tokyo (JP)

(*) Notice: Subject to any disclaimer, the term of this patent is extended or adjusted under 35 U.S.C. 154(b) by 0 days.

(21) Appl. No.: 14/766,270

(22) PCT Filed: Feb. 6, 2014

(86) PCT No.: PCT/JP2014/052799
§ 371 (c)(1),
(2) Date: Aug. 6, 2015

(87) PCT Pub. No.: WO2014/123200
PCT Pub. Date: Aug. 14, 2014

(65) Prior Publication Data
US 2015/0376051 A1    Dec. 31, 2015

(30) Foreign Application Priority Data
Feb. 6, 2013 (JP) ................................. 2013-021338

(51) Int. Cl.
*C03C 3/155* (2006.01)
*C03C 3/19* (2006.01)
*C03C 3/21* (2006.01)
*C03C 3/15* (2006.01)
*C03C 3/068* (2006.01)
*C03B 23/00* (2006.01)
*G02B 1/00* (2006.01)
*G02B 3/02* (2006.01)
*C03B 40/04* (2006.01)
*C03B 11/12* (2006.01)
*G02B 3/00* (2006.01)
*G02B 5/04* (2006.01)
*G02B 5/18* (2006.01)

(52) U.S. Cl.
CPC .............. *C03C 3/21* (2013.01); *C03B 11/122* (2013.01); *C03B 23/0013* (2013.01); *C03B 40/04* (2013.01); *C03C 3/068* (2013.01); *C03C 3/15* (2013.01); *C03C 3/155* (2013.01); *C03C 3/19* (2013.01); *G02B 1/00* (2013.01); *G02B 3/02* (2013.01); *C03B 2215/46* (2013.01); *C03B 2215/66* (2013.01); *G02B 3/00* (2013.01); *G02B 3/0006* (2013.01); *G02B 5/04* (2013.01); *G02B 5/18* (2013.01)

(58) Field of Classification Search
CPC .......... C03C 3/068; C03C 3/15; C03C 3/155; C03C 3/19; C03C 3/21
See application file for complete search history.

(56) References Cited

U.S. PATENT DOCUMENTS

| | | | |
|---|---|---|---|
| 2003/0125186 A1 | 7/2003 | Hayashi et al. | |
| 2003/0161048 A1* | 8/2003 | Tsuda | C03C 3/076 359/652 |
| 2004/0116272 A1* | 6/2004 | Uehara | C03C 3/068 501/78 |
| 2004/0220041 A1* | 11/2004 | Isowaki | C03C 3/068 501/78 |
| 2005/0113240 A1 | 5/2005 | Hayashi et al. | |
| 2007/0247721 A1* | 10/2007 | Kasuga | C03C 3/068 359/642 |
| 2008/0026928 A1 | 1/2008 | Hayashi et al. | |
| 2008/0312062 A1* | 12/2008 | Sasai | C03C 3/068 501/50 |
| 2009/0069165 A1* | 3/2009 | Fu | C03C 3/064 501/42 |
| 2009/0082190 A1* | 3/2009 | Ogino | C03C 3/068 501/78 |
| 2009/0088310 A1* | 4/2009 | Suzuki | C03C 3/068 501/78 |
| 2009/0093357 A1* | 4/2009 | Sasai | C03C 3/155 501/78 |
| 2009/0124481 A1* | 5/2009 | Fu | C03C 3/068 501/78 |
| 2011/0237419 A1 | 9/2011 | Suzuki et al. | |
| 2012/0194064 A1* | 8/2012 | Wada | C03C 3/066 313/504 |

FOREIGN PATENT DOCUMENTS

JP    2002-249337 A    9/2002
JP    2007-269584 A    10/2007

OTHER PUBLICATIONS

May 13, 2014 International Search Report issued in International Patent Application No. PCT/JP2014/052799.
Aug. 20, 2015 International Preliminary Report on Patentability issued in International Patent Application No. PCT/JP2014/052799.

* cited by examiner

*Primary Examiner* — Anthony J Green
*Assistant Examiner* — Elizabeth A Bolden
(74) *Attorney, Agent, or Firm* — Oliff PLC

(57) ABSTRACT

An optical glass includes $P_2O_5$, $B_2O_3$ and a rare earth oxide as essential components, and in a glass composition based on oxides, the $P_2O_5$ content is in the range of over 0 weight % and less than 0.79 weight %, the $B_2O_3$ content is in the range of 20-40 weight % and the total content of the rare earth oxide and an oxide selected from the group including of $Ta_2O_5$, $WO_3$, $TiO_2$, $Nb_2O_5$ and $Bi_2O_3$ is in the range of 35-70 weight %. Further, this optical glass has a refractive index (nd) in the range of 1.72-1.83, an Abbe number (υd) in the range of 45-55 and a glass transition temperature (Tg) of 640° C. or less.

13 Claims, 1 Drawing Sheet

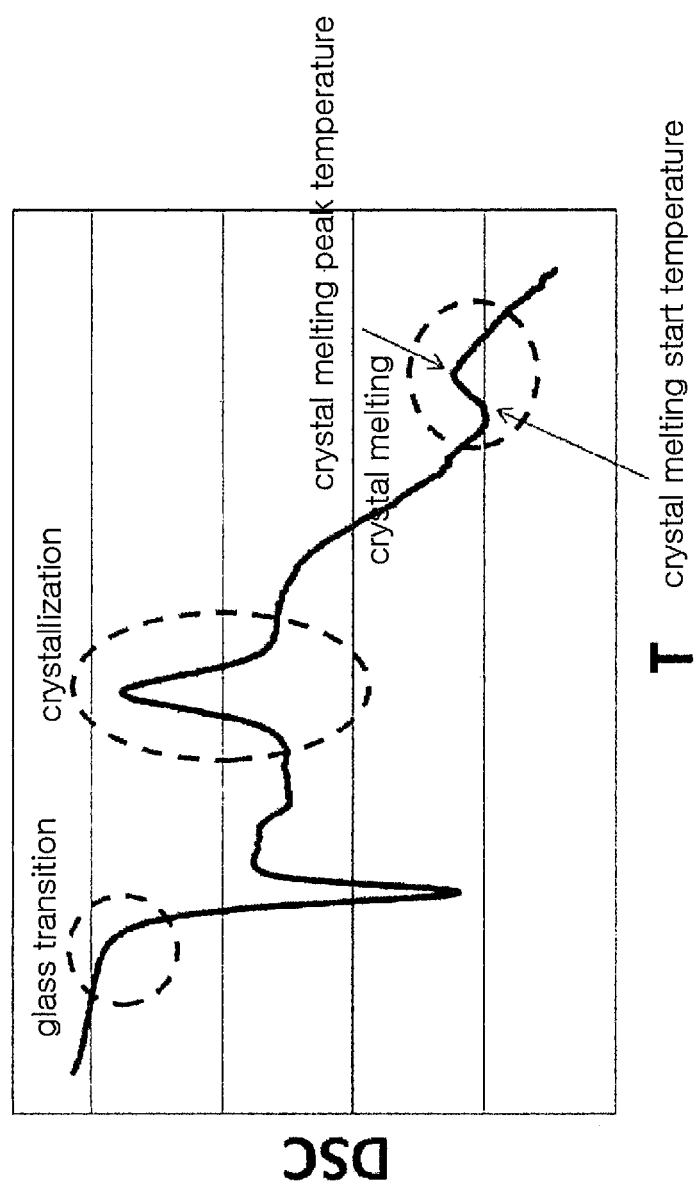

OPTICAL GLASS, HOT-MOLDED ARTICLE AND METHOD OF MANUFACTURING THE SAME, OPTICAL ELEMENT AND METHOD OF MANUFACTURING THE SAME

INCORPORATION BY REFERENCE

This application claims the benefit of the priority to Japanese Patent Application No. 2013-021338, filed on Feb. 6, 2013, which is expressly incorporated herein by reference in its entirety.

BACKGROUND OF THE INVENTION

1. Field of the Invention

The present invention relates to an optical glass, a hot-molded article and a method of manufacturing the same, and an optical element and a method of manufacturing the same.

2. Description of Related Art

In recent years, high integration and high functionality of equipment that uses an optical system have rapidly progressed with the advent of the digital camera. Under such circumstances, there has been increasingly strong demand for optical systems being made in higher precision, in lighter weight, and more compact. In order to meet this demand, optical designs employing aspherical lenses have been becoming the mainstream.

As a method of manufacturing a lens constituting an optical system, there has been known a method in which glass material is subjected to a cold processing or which a molded glass article obtained by reheat press-molding is subjected to a cold processing. Here, the cold processing refers to machine processings such as grinding and polishing. For optical glass which is subjected to the cold processing, Japanese Unexamined Patent Publication No. 2007-269584, which is expressly incorporated herein by reference in its entirety, discloses boric acid-based optical glass.

Compared to the cold processing mentioned above, there is a method called a hot molding method, where an appropriate amount is taken from an outflowing glass melt and made into a molten glass gob, which is then molded to obtain a preform for an optical element before the molten glass gob gets cooled and solidified. There is also a method called a precision press-molding method, which press-molds a preform to form an optical functional surface of a lens without going through machine processing such as grinding and polishing. These hot molding method and precision press-molding method have been used for stably weight supplying, at low cost, aspheric lenses mainly employing high functional glass. For an optical glass suitable for these molding methods, Japanese Unexamined Patent Publication No. 2002-249337, which is expressly incorporated herein by reference in its entirety, discloses boric acid-rare earth system optical glass showing a high refractive index and low dispersion characteristics.

SUMMARY OF THE INVENTION

Optical glass having a high refractive index and low dispersion characteristics is suitable for a lens constituting an optical system. To improve the quality of this kind of optical glass, it is important to reduce the generation of striae or change in optical properties, which occurs due to volatilization at the time of glass melting, and to suppress coloration caused by contamination from the melting crucible material. The prior art has room for improvement in this respect.

Therefore, one aspect of the present invention is to provide high quality optical glass having a high refractive index and low dispersion characteristics.

Further, one aspect of the present invention is to provide a hot molded article consisting of the above-mentioned optical glass, a method of manufacturing the same, an optical element and a method of manufacturing the same.

That is, one aspect of the present invention relates to:

an optical glass (hereinafter referred to as "glass A") comprising $P_2O_5$, $B_2O_3$, and a rare earth oxide as essential components, wherein in a glass composition based on oxides, $P_2O_5$ content is in the range of over 0 weight % and less than 0.79 weight %, $B_2O_3$ content is in the range of 20 to 40 weight %, and the total content of the rare earth oxide and an oxide selected from the group consisting of $Ta_2O_5$, $WO_3$, $TiO_2$, $Nb_2O_5$ and $Bi_2O_3$ is in the range of 35 to 70 weight %, the optical glass having a refractive index nd of 1.72 to 1.83, an Abbe number νd of 45 to 55, and an optical glass transition temperature Tg of 640° C. or less; and an optical glass (hereinafter referred to as "glass B") comprising, over 0 but less than 0.79 weight % of $P_2O_5$, 20 to 40 weight % of $B_2O_3$, and 35 to 60 weight % of a rare earth oxide, the optical glass having a refractive index nd of 1.72 to 1.83, an Abbes number νd of 45 to 55, and an optical glass transition temperature Tg of 640° C. or less.

The present inventors have conducted extensive studies in order to obtain the above optical glass. As a result, it has been newly found that, by introducing P in a trace amount in rare earth borate based optical glass, it is possible to greatly lower a liquidus temperature. Since the optical glass having a lowered liquidus temperature can prevent contamination caused by volatilization during glass melting or by the material in the crucible used for performing melting, it can reduce the generation of striae or changes in optical properties, and suppress coloring.

According to the above-described one aspect, it is possible to provide rare earth borate optical glass having a high refractive index and low dispersion characteristics. Further, according to one aspect, hot molded articles and optical elements made from the above-described optical glass are also provided.

BRIEF DESCRIPTION OF THE DRAWINGS

FIG. 1 is an example of a DSC chart.

DETAILED DESCRIPTION OF EMBODIMENTS

[Optical Glass]

An optical glass according to one aspect of the present invention includes the above glasses A and B. The detailed description thereof will be given. Unless specifically indicated otherwise, the following description is applied to both glass A and glass B.

Hereinafter, the optical glass according to one aspect of the present invention is described in details as follows.

Glass Composition

As described above, a glass composition of the optical glass in the present invention is indicated based on oxides.

Here, the term "glass composition based on oxides" refers to a glass composition as converted into the form of oxides in the optical glass after all the glass starting materials have been fully decomposed during melting. Also, unless specifically indicated otherwise, the glass composition is assumed to be denoted based on weight.

The glass composition in the present invention is obtained by the ICP-AES (Inductively Coupled Plasma-Atomic Emission Spectrometry). The analysis values determined by the analysis method have a measurement error of about ±5%.

Further, in this specification and the present invention, the 0% of a component content means that this component is substantially not contained, and the content of this component is less than about an impurity level.

The above-described optical glass contains over 0% but less than 0.79% of $P_2O_5$. When the optical glass contains over 0% of $P_2O_5$, it is possible to greatly lower the liquidus temperature of the rare earth borate based optical glass having a high refractive index and low dispersion characteristics, as compared with when it does not contain P. On the other hand, when $P_2O_5$ content is 0.79% or more, a phenomenon is observed in which crystals are precipitated in the glass obtained after it has been melted and solidified. It is presumed that the precipitations are generated by the reaction of P and rare earth based elements. Therefore, in order to obtain homogeneous optical glass, the $P_2O_5$ content of the optical glass is less than 0.79%. Here, over 0% of the $P_2O_5$ content means that the $P_2O_5$ content exceeds the impurity level.

The above optical glass is rare earth borate based optical glass, and contains 20-40% of $B_2O_3$ as an essential component. $B_2O_3$, which is a glass network structure forming oxide, has the effect of increasing the stability of the above optical glass containing a rare earth oxide. When the $B_2O_3$ content is less than 20%, the stability of the glass deteriorates. Accordingly, 20% or more, preferably 22% or more, and more preferably 24% or more is introduced. On the other hand, when the quantity introduced exceeds 40%, the refractive index and chemical durability tend to deteriorate. Accordingly, the $B_2O_3$ content is 40% or less, preferably 37% or less, and more preferably 35% or less, A rare earth oxide is a component having an effect of imparting a high refractive index and low dispersion characteristics, while maintaining the devitrification stability of the glass. Glass B is rare earth borate based optical glass and includes at least one kind of rare earth oxide. In glass B, when the content of the rare earth oxide is less than 35%, it is impossible to sufficiently obtain the effect described above. When the quantity introduced exceeds 60%, the devitrification stability tends to deteriorate. Therefore, glass B contains 35 to 60% of the rare earth oxide as an essential component. From the viewpoint of maintaining both the devitrification stability and the high refractive index and low dispersion characteristics of the glass, the content of rare earth oxides in glass B is preferably 38% or more, and more preferably 40% or more, and preferably 67% or less, and more preferably 65% or less.

On the other hand, glass A also includes at least one kind of rare earth oxide as an essential component. In glass A, the total content of the rare earth oxide and an oxide selected from the group consisting of $Ta_2O_5$, $WO_3$, $TiO_2$, $Nb_2O_5$, and $Bi_2O_3$, which are optional components, (the rare earth oxide+$Ta_2O_5$+$WO_3$+$TiO_2$+$Nb_2O_5$+$Bi_2O_3$), is 35% or more, preferably 40% or more, and more preferably 45% or more from the viewpoint of obtaining a high refractive index and low dispersion characteristics while maintaining the devitrification stability of the glass. From the viewpoint of maintaining the devitrification stability of the glass, the total content of the rare earth oxide and an oxide selected from said group in glass A is 70% or less, preferably 65% or less, and more preferably 60% or less. The content of the rare earth oxide in glass A is preferably in the range from 35 to 60%. For the above reasons, the content of the rare earth oxide in glass A is more preferably 38% or more, and much more preferably 40% or more, and more preferably 67% or less, and much more preferably 65% or less.

As the rare earth oxide, from the viewpoint of obtaining the above-described effect excellently, $Ln_2O_3$ (Ln is at least one kind of rare earth element selected from the group consisting of Y, La, Gd, Yb and Lu) may be preferably introduced. More preferably, at least one of $La_2O_3$ and $Gd_2O_3$ may be introduced, and much more preferably, at least $La_2O_3$ may be introduced. The total quantity of the rare earth oxide may consist of $La_2O_3$ only. In view of the foregoing, an introduced quantity of $La_2O_3$ in glass A and glass B is preferably 20-45%, and more preferably in the range of 25-35%. Also, in view of the above, an introduced quantity of $Gd_2O_3$ in the glass A and glass B is preferably 0-30%, and more preferably in the range of 20-30%. Further, $Y_2O_3$ content may be 0%. When $Y_2O_3$ is introduced, $Y_2O_3$ content is preferably in the range of 1-10%, and more preferably in the range of 1-6%.

Since ZnO and alkali metal oxide are effective components for lowering the glass transition temperature, in the above optical glasses, it is preferable to introduce one or both of them, and it is more preferable to introduce at least ZnO. In order to lower the glass transition temperature, ZnO content is preferably 2% or more, more preferably 4% or more, much more preferably 5% or more, and far more preferably over 10 percent. Meanwhile, when a large quantity is introduced, the devitrification stability and chemical durability tend to deteriorate. Accordingly, ZnO content is preferably 25% or less, more preferably 22% or less, and much more preferably 20% or less.

Both of glass A and glass B are rare earth borate based optical glass and contain $B_2O_3$, which is a network-forming component, as an essential component. Together with $B_2O_3$, $SiO_2$ which is a network-forming component may also be included. In glass A and glass B, $SiO_2$ content is, for example, 0.5% or more, and it can also be at least 1%. Further, $SiO_2$ content is, for example, 10% or less, and it can also be below 8%. From the viewpoint of lowering the glass transition temperature, it is preferred that a weight ratio of ZnO to the total content of $B_2O_3$ and $SiO_2$, which are network-forming components, [ZnO/($B_2O_3$+$SiO_2$)] exceeds 0.11. The weight ratio is more preferably 0.12 or more, much more preferably 0.20 or more, and still more preferably 0.30 or more. On the other hand, in view of the devitrification stability and chemical durability, the weight ratio [ZnO/($B_2O_3$+$SiO_2$)] is preferably 1.1 or less, more preferably 1.0 or less, much more preferably 0.70 or less, still more preferably 0.50 or less.

An alkali metal oxide, as described above, is an effective component to lower the glass transition temperature, but when a large quantity is introduced, the devitrification stability tends to deteriorate. For this reason, the content of the alkali metal oxide in the above optical glass is preferably in the range of 0-10%. To effectively lower the glass transition temperature, the content is more preferably 0.1% or more, and much more preferably 0.2% or more. From the viewpoint of maintaining good devitrification stability, the content is more preferably 8% or less and much more preferably 6% or less.

As the alkali metal oxide, it is advantageous to introduce at least $Li_2O$ for the purpose of obtaining an optical glass exhibiting a low glass transition temperature. The total quantity of the alkali metal oxide may also consist of $Li_2O$ only. To lower the glass transition temperature, the content of $Li_2O$ in the above-described optical glass is preferably 0.1% or more, more preferably 0.2% or more, and much more preferably 0.3% or more. On the other hand, in view of the devitrification stability of the glass, the content of $Li_2O$ is preferably 1.5% or less, more preferably 1.0% or less, and much more preferably 0.6% or less. When the stability of the glass is emphasized, the content of $Li_2O$ can also be 0%.

Other alkali metal oxides, $Na_2O$ and $K_2O$, are both components that can be added to lower the glass transition temperature. The content of $Na_2O$ in the above optical glass, for example, can be 0.1% or more, preferably 0.2% or more, and more preferably 0.3% or more. The content of $K_2O$ is, for example, can be 0.1% or more, preferably 0.2% or more, and more preferably 0.3% or more. Also, from the viewpoint of devitrification stability, the content of $Na_2O$, for example, can be 9% or less, preferably 8% or less, and more preferably 7% or less. The content of $K_2O$, for example, can be 9% or less, preferably 8% or less, and more preferably 7% or less.

Any one of the divalent components of MgO, CaO, SrO, and BaO can be introduced to lower the glass transition temperature. From the viewpoint of achieving both the desired glass transition temperature and good devitrification stability, each of the contents introduced is preferably 0.1% or more, and more preferably 0.2% or more, preferably 0.3% or less, and more preferably 10% or less. Further, from the same viewpoint, the total content of divalent components is preferably 0.1% or more, and more preferably 0.2% or more, and preferably 0.3% or less, and more preferably 10% or less.

$Al_2O_3$ can be introduced in order to improve the high temperature viscosity and chemical durability of the glass, and to lower the liquidus temperature. From the viewpoint of obtaining these effects satisfactorily, the content of $Al_2O_3$ in the above optical glass is preferably 0.1% or more, and more preferably 0.2% or more, and preferably 10% or less, and more preferably 8% or less.

$Ta_2O_5$, $WO_3$, $TiO_2$, $Nb_2O_5$, and $Bi_2O_3$ can be introduced to improve the stability and refractive index of the glass.

Glass A and glass B may or may not include one or more selected from the group consisting of $Ta_2O_5$, $WO_3$, $TiO_2$, $Nb_2O_5$, and $Bi_2O_3$. Also, in glass A, the total content of oxides selected from the group and the rare earth oxide is as previously described.

In glass A and glass B, from the viewpoint of obtaining these effects satisfactorily while maintaining devitrification stability, the content of $Ta_2O_5$ is preferably 0.5% or more, and more preferably 0.7% or more, and preferably 10% or less, and more preferably 8% or less.

From the same viewpoint, the content of $WO_3$ is preferably 0.5% or more, and more preferably 0.7% or more, and preferably 10% or less, and more preferably 8% or less.

From the same viewpoint, the content of $TiO_2$ is preferably 0.2% or more, more preferably 0.5% or more, and much more preferably 0.7% or more, and preferably 10% or less, and more preferably 8% or less.

From the same viewpoint, the content of $Nb_2O_5$ is preferably 0.4% or more, more preferably 0.5% or more, and much more preferably 0.7% or more, and preferably 10% or less, and more preferably 8% or less.

From the same viewpoint, the content of $Bi_2O_3$ is preferably 0.5% or more, and more preferably 0.7% or more, and preferably 10% or less, and more preferably 8% or less.

Further, $ZrO_2$ is an optional component that can also be introduced into glass A and glass B to improve the stability and refractive index of the glass. Glass A and glass B may or may not include $ZrO_2$.

In glass A and glass B, from the viewpoint of obtaining the effects satisfactorily while maintaining their devitrification stability, the content of $ZrO_2$ is preferably 0.5% or more, more preferably 0.7% or more, much more preferably 1% or more, and still more preferably 3% or more, and preferably 10% or less, and more preferably 8% or less.

Furthermore, the above-mentioned optical glasses may also include a clarifying agent selected from the group consisting of $SnO_2$ and $Sb_2O_3$. The content of each component may be about 0-1%.

Glass Properties

The foregoing optical glass is a high refractive index and low dispersion optical glass, with a refractive index nd of 1.72 to 1.83 and an Abbes number vd of 45-55. The refractive index nd is more preferably 1.74 or more, and much more preferably 1.75 or more for the lower limit, and more preferably 1.81 or less, much more preferably 1.79 or less, and still more preferably less than 1.78 for the upper limit. Meanwhile, the Abbe number vd is more preferably 46 or more, and much more preferably 48 or more for the lower limit, and more preferably 53 or less, and much more preferably 51 or less for the upper limit. Optical glass having the above refractive index nd and Abbe number vd is useful in optical systems.

From the viewpoint of suppressing damage that is caused in a high temperature environment at the time of press molding to a mold itself or to a mold release film provided on the mold surface of the mold, it is required that the glass transition temperature (Tg) be lowered in the glass to be used for precision press molding. Since the above optical glass has a relatively low glass transition temperature of 640° C. or lower, it is suitable for precision press molding. The upper limit value of the glass transition temperature Tg is preferably 630° C. or lower, more preferably 625° C. or lower, and much more preferably 620° C. or lower. The lower limit of the glass transition temperature Tg is not particularly limited but is usually 400° C. or higher.

Furthermore, the above-mentioned optical glass, by containing P in a very small amount, can exhibit a liquidus temperature lower than when it does not contain P. As described above, since the lowered liquidus temperature can prevent contamination caused by volatilization during glass melting or by the material in the crucible performing melting, it can reduce generation of striae or changes in optical properties, and suppress coloring. The glass having the lowered liquidus temperature, as described below, is suitable for hot molding.

As described above, the above-described optical glass has a high refractive index and low dispersion characteristics, and it is suitable for hot molding and precision press molding.

In order to obtain optical glass with a target glass composition, oxides, carbonates, sulfates, nitrates, hydroxides and the like that are starting materials are weighed out, blended and thoroughly mixed to form a mixed batch; then, the mixed batch is heated, melted, degassed and stirred in a melting vessel to yield a molten glass that is homogeneous and does not contain bubbles, and then the molten glass is molded to obtain an optical glass with a target glass composition. Specifically, such optical glass can be produced using known melting methods.

[Hot Molded Article and Method of Manufacturing the Same]

One aspect of the invention relates to a hot-molded article made from the above-described optical glass, and a method of manufacturing the hot-molded article including a step of obtaining a molded article by hot molding the above-mentioned optical glass.

Since the above optical glass can exhibit a liquidus temperature lower than when it does not contain P, it can lower a temperature at which the molten glass is caused to flow out in hot molding. This makes it possible to prevent crystals from precipitating out in a hot molded article (preform). Moreover, since it can lower a temperature at which the glass melts, mixing of a foreign matter into the glass or its coloring, which is caused by corrosion of a crucible performing the melting, can be prevented.

The hot molding is a molding method of obtaining a molded article from molten glass without undergoing a cold processing such as grinding and polishing. According to one embodiment, glass starting materials from which the above-mentioned optical glass can be obtained are melted, clarified, and stirred to make homogeneous molten glass. Thereafter, the molten glass is induced to flow out of a platinum or platinum alloy pipe to obtain a glass gob, which is then used to form a hot-molded article. In this embodiment, the molten glass is allowed to flow out continuously from the outlet of the above-mentioned pipe, and the leading end of the molten glass that has flown out from the outlet is separated to obtain a predetermined amount of glass gob. The resulting glass gob is molded into a preform shape while the glass is in a plastically deformable temperature range. As a method of separating the leading end of the molten glass that has flown out, a dropping method or a descent-cutting method can be used. Thanks to the use of the above optical glass, the leading end of the molten glass that has flown out from the outlet can be separated without devitrification of the glass. By keeping the flowing speed and temperature constant, and by keeping the dropping or descending condition constant as well, a constant weight of preform can be prepared with good reproducibility and high precision. According to this embodiment, for example, 1~5000 mg by weight of preform can be prepared with high weight accuracy.

In one embodiment, the separated leading end of the glass, for example, is received on a mold where gas is blown upward from a concave molding surface, and then it is molded into a preform, such as in a spherical or oval spherical shape, by the air pressure of the gas floating or rotating it. Such molding process is referred to as a floating molding process. Or there is also known a method of obtaining a preform by press molding a molten glass gob with a lower mold member and an upper mold member, and this method can be used for hot molding as described above. Thus obtained hot-molded article may be provided with a known mold releasing film on the surface, if necessary.

Since the hot-molded article described above is made of an optical glass having a glass transition temperature particularly suitable for precision press molding, it can be suitably used as a preform for precision press molding. For precision press molding, it will be described later.

[Optical Element and Method of Manufacturing Thereof]

Another aspect of the present invention relates to an optical element made from the above-described optical glass, and a method of manufacturing an optical element, including the step of obtaining an optical element by precision press-molding the above-mentioned hot molded article.

The precision press-molding method is also called a mold optics molding method and well known in the technical field to which the invention pertains. A surface that transmits, refracts, diffracts, or reflects a light beam of an optical element is called an optically functional surface. Taking a lens as an example, the lens surface such as the aspherical surface of an aspherical lens or the spherical surface of a spherical lens corresponds to an optically functional surface. The precision press-molding method is a method of forming an optically functional surface in press molding by precisely transferring the molding surface of the pressing mold to the glass. That is, it is not necessary to apply a mechanical processing such as grinding or polishing to finish optically functional surfaces. The precision press-molding method is suitable for production of optical elements such as a lens, a lens array, a diffraction grating, a prism, and the like, and in particular, it is optimal as a method for producing aspherical lenses with high productivity.

For the hot-molded article mentioned above, the glass transition temperature Tg is low, 640° C. or less, and the press in the press molding of the glass can be conducted at a relatively low temperature. Therefore, the burden given to the molding surface of the pressing mold is reduced, and it is possible to extend the life of the mold. Moreover, since it is also possible to have excellent devitrification stability, it is possible to effectively prevent devitrification of the glass even in re-heating and pressing steps. Furthermore, it is possible to perform a series of steps for obtaining a final product from melting glass with high productivity.

In one embodiment of the precision press molding, a preform with its surface cleaned is re-heated to make the viscosity of the glass constituting the preform exhibits the range of $10^5$ to $10^{11}$ Pa·s, and the re-heated preform is press molded with a mold equipped with an upper mold member and a lower mold member. A mold release film may be provided, as needed, on the molding surface of the mold. Further, the press forming, in order to prevent oxidation of the molding surface of the mold, is preferably carried out in an nitrogen gas or inert gas atmosphere. A press-molded article is taken out from the mold and gradually cooled as needed. When the molded article is an optical element such as a lens, an optical thin film may be provided on the surface, as needed.

According to the above, since a refractive index (nd) is in the range of 1.72-1.83, an Abbe number (υd) is in the range of 45-55 and a glass transition temperature (Tg) is 640° C. or less, it is suitable for precision press molding, and since a low liquidus temperature can be obtained, optical elements, such as a lens, a lens array, a diffraction grating, a prism and the like, which are made of low dispersion borate system optical glass with a high refractive index that is suitable for hot molding, can be manufactured with good productivity and high accuracy.

EXAMPLES

The present invention is further described below through Examples. However, the present invention is not limited to the embodiments given in Examples.

1. Examples and Comparative Examples Relating to an Optical Glass

In order to obtain optical glass with compositions indicated in Table 1 and Table 2, 250~300 g of glass starting materials, such as oxides, carbonates, sulfates, nitrates, hydroxides and the like which correspond to glass components, were weighed out in a predetermined ratio, and thoroughly mixed to form a blended batch. This was charged to a crucible made of platinum, and melting of the glass was performed for 2-4 hours in air while it is stirred at 1200~1250° C. After melting, the molten glass was poured into a mold of carbon of 40×70×15 mm, and allowed to cool to its glass transition temperature. And then it was immediately placed in an annealing furnace, annealed for about 1 hour in the transition temperature range of the glass, and allowed to cool to a room temperature in the furnace. In this manner, the respective optical glasses were obtained.

By the following methods, the refractive index, the Abbe number, the glass transition temperature, and the crystalline melting temperature of each of the obtained optical glasses were measured.

Measurement Method (1) Refractive index (nd) and Abbe number (vd)

These were measured on the obtained optical glasses at a gradual cooling temperature decrease rate of −30° C./hour (2) Glass transition temperature Tg This was measured under conditions of a temperature increase of 10° C./minute with a different scanning calorimeter (DSC).

(3) Crystal melting temperature (crystal melting start temperature and crystal melting peak temperature)

In the present Example, a crystalline melting temperature was used as an index of the liquidus temperature. Crystal melting temperatures (crystal melting start temperature and crystal melting peak temperature) were measured under conditions of the temperature increase rate of 10° C./minute with DSC. FIG. 1 is an example of a DSC chart. The vertical axis denotes DSC and the horizontal axis denotes temperature (T). The DSC chart has regions indicating glass transition, crystallization, and crystal melting. As shown in FIG. 1, the crystal melting start temperature is a temperature at which the DSC begins to rise in the crystal melting region, and the crystal melting peak temperature is a temperature at which the DSC reaches a peak in the crystal melting region.

In the DSC measurement, it is possible to obtain a crystal melting peak temperature or crystal melting start temperature which becomes an index of the liquidus temperature in a relatively simple and highly accurate manner.

Measured results are shown in Table 1 and Table 2.

TABLE 1

| | Glass composition (mass %) | | | | | | | | | | | | | | |
|---|---|---|---|---|---|---|---|---|---|---|---|---|---|---|---|
| | $B_2O_3$ | $SiO_2$ | $Li_2O$ | ZnO | $La_2O_3$ | $Gd_2O_3$ | $Y_2O_3$ | Σ $Ln_2O_3$ | $TiO_2$ | $ZrO_2$ | $Ta_2O_5$ | $P_2O_5$ | $Nb_2O_5$ | $WO_3$ | $B_2O_3$ |
| Ex. 1 | 29.57 | | 0.61 | 11.15 | 26.78 | 24.83 | | 51.62 | | 5.06 | 1.51 | 0.43 | | | |
| Ex. 2 | 27.40 | 2.53 | | 11.44 | 27.47 | 25.47 | | 52.95 | | 5.20 | | 0.44 | | | |
| Ex. 3 | 27.75 | 2.09 | 0.52 | 10.20 | 28.35 | 24.61 | | 52.96 | | 6.00 | | 0.44 | | | |
| Ex. 4 | 26.80 | 2.48 | 0.62 | 11.19 | 26.88 | 24.92 | 1.55 | 53.35 | | 5.08 | | 0.43 | | | |
| Ex. 5 | 29.69 | | | 11.20 | 26.89 | 24.93 | | 51.82 | | 5.08 | 1.52 | 0.65 | | | |
| Ex. 6 | 28.22 | 1.74 | 0.54 | 10.31 | 29.48 | 23.61 | | 53.09 | | 5.35 | | 0.23 | 0.48 | | |
| Ex. 7 | 27.15 | 2.15 | 0.53 | 10.48 | 27.97 | 25.29 | | 53.26 | | 3.53 | 1.58 | 0.45 | | 0.83 | |
| Ex. 8 | 26.53 | 2.49 | 0.62 | 11.24 | 27.00 | 25.04 | | 52.04 | 1.10 | 5.11 | | 0.44 | | | |
| Ex. 9 | 25.39 | 2.03 | 0.40 | 15.36 | 25.43 | 24.61 | | 50.04 | | 4.82 | 1.49 | 0.43 | | | |
| Ex. 10 | 22.66 | 1.81 | 0.36 | 24.48 | 22.70 | 21.96 | | 44.65 | | 4.30 | 1.33 | 0.38 | | | |
| Ex. 11 | 28.35 | 2.26 | 0.45 | 5.51 | 28.40 | 27.47 | | 55.87 | | 5.38 | 1.66 | 0.48 | | | |
| Ex. 12 | 35.54 | 2.84 | 0.56 | 12.29 | 20.23 | 19.05 | | 39.29 | | 6.74 | 2.09 | 0.60 | | | |
| Ex. 13 | 36.33 | 3.13 | 0.62 | 13.56 | 35.90 | | | 35.90 | | 7.44 | 2.30 | 0.66 | | | |
| Ex. 14 | 38.59 | 1.77 | 0.35 | 7.67 | 41.42 | 5.49 | | 46.90 | | 3.27 | 1.04 | 0.37 | | | |
| Ex. 15 | 29.59 | 7.65 | 0.51 | 4.14 | 34.77 | 10.98 | 3.83 | 49.59 | | 6.06 | 1.87 | 0.54 | | | |
| Ex. 16 | 24.59 | 1.18 | 0.39 | 3.19 | 43.78 | 8.45 | | 52.22 | | 7.88 | 10.10 | 0.41 | | | |
| Ex. 17 | 29.09 | | 0.45 | 3.64 | 32.95 | 9.64 | 5.05 | 47.64 | | 7.16 | 11.52 | 0.47 | | | |
| Ex. 18 | 27.79 | | 0.43 | 3.47 | 45.39 | 9.21 | 4.82 | 59.41 | | 6.84 | 1.57 | 0.45 | | | |
| Ex. 19 | 33.22 | | 0.49 | 4.01 | 41.68 | 10.63 | 5.56 | 57.87 | | 3.85 | | 0.52 | | | |
| Ex. 20 | 35.42 | | 0.52 | 4.28 | 35.89 | 11.33 | 5.93 | 53.15 | | 4.10 | 1.93 | 0.55 | | | |
| Ex. 21 | 29.59 | 7.65 | 0.51 | 4.14 | 34.77 | 10.98 | 3.83 | 49.59 | | 6.06 | 1.87 | 0.54 | | | |
| Ex. 22 | 25.50 | 6.46 | | 22.17 | 29.38 | 9.28 | | 38.66 | | 5.12 | 1.58 | 0.45 | | | |
| Ex. 23 | 25.97 | 4.82 | | 14.26 | 29.92 | 9.45 | | 39.36 | | 7.02 | 8.06 | 0.46 | | | |
| Ex. 24 | 26.28 | 4.79 | | 14.15 | 29.70 | 9.38 | | 39.08 | | 6.96 | 8.00 | 0.69 | | | |

| | Glass composition (mass %) | | | Glass properties | | | Crystal melting temperature (° C.) | | Presence |
|---|---|---|---|---|---|---|---|---|---|
| | $Ln_2O_3 + Ta_2O_5 + WO_3 + TiO_2 + Nb_2O_5 + Bi_2O_3$ | $Sb_2O_3$ | ZnO/ ($B_2O_3 + SiO_2$) | nd | vd | Tg (° C.) | Crystal melting start temperature | Crystal melting peak temperature | or absence of crystals in the glass |
| Ex. 1 | 53.13 | 0.04 | 0.377 | 1.77164 | 49.69 | 607 | 1005 | 1050 | ○ |
| Ex. 2 | 52.95 | 0.04 | 0.382 | 1.77133 | 49.98 | 640 | 1024 | 1048 | ○ |
| Ex. 3 | 52.96 | 0.04 | 0.342 | 1.77074 | 49.91 | 614 | 1045 | 1063 | ○ |
| Ex. 4 | 53.35 | 0.04 | 0.382 | 1.76950 | 49.73 | 609 | 1023 | 1079 | ○ |
| Ex. 5 | 53.34 | 0.04 | 0.377 | 1.77075 | 49.56 | 629 | 983 | 1009 | ○ |
| Ex. 6 | 53.57 | 0.04 | 0.344 | 1.77102 | 49.70 | 618 | 1028 | 1047 | ○ |
| Ex. 7 | 55.67 | 0.04 | 0.358 | 1.77005 | 49.57 | 614 | 1043 | 1066 | ○ |
| Ex. 8 | 53.14 | 0.04 | 0.385 | 1.77551 | 48.23 | 608 | 1017 | 1053 | ○ |
| Ex. 9 | 51.53 | 0.04 | 0.560 | 1.77836 | 48.84 | 599 | 1021 | 1052 | ○ |
| Ex. 10 | 45.98 | 0.04 | 1.00 | 1.79272 | 47.15 | 585 | 1047 | 1064 | ○ |
| Ex. 11 | 57.53 | 0.04 | 0.180 | 1.76887 | 49.96 | 628 | 1007 | 1030 | ○ |
| Ex. 12 | 41.37 | 0.06 | 0.320 | 1.72011 | 51.19 | 612 | 952 | 985 | ○ |
| Ex. 13 | 38.20 | 0.06 | 0.344 | 1.72043 | 51.52 | 614 | 945 | 974 | ○ |

TABLE 1-continued

| | | | | | | | | | |
|---|---|---|---|---|---|---|---|---|---|
| Ex. 14 | 47.94 | 0.03 | 0.190 | 1.72014 | 53.42 | 623 | 1051 | 1077 | o |
| Ex. 15 | 51.46 | 0.05 | 0.111 | 1.80989 | 45.43 | 610 | 1022 | 1039 | o |
| Ex. 16 | 62.32 | 0.04 | 0.124 | 1.82177 | 45.02 | 624 | 998 | 1033 | o |
| Ex. 17 | 59.16 | 0.04 | 0.125 | 1.78860 | 45.57 | 627 | 1000 | 1046 | o |
| Ex. 18 | 60.98 | 0.04 | 0.125 | 1.79753 | 48.27 | 628 | 1047 | 1062 | o |
| Ex. 19 | 57.87 | 0.05 | 0.121 | 1.75575 | 51.44 | 627 | 1036 | 1058 | o |
| Ex. 20 | 55.08 | 0.05 | 0.121 | 1.74217 | 51.30 | 621 | 1032 | 1055 | o |
| Ex. 21 | 51.46 | 0.05 | 0.111 | 1.73339 | 51.55 | 619 | 1024 | 1045 | o |
| Ex. 22 | 40.24 | 0.04 | 0.694 | 1.75046 | 49.83 | 607 | 1008 | 1028 | o |
| Ex. 23 | 47.43 | 0.04 | 0.463 | 1.77043 | 47.10 | 611 | 1011 | 1035 | o |
| Ex. 24 | 47.08 | 0.04 | 0.456 | 1.76707 | 47.34 | 612 | 1008 | 1030 | o |

TABLE 2

| | Glass composition (mass %) | | | | | | | | | | | | | |
|---|---|---|---|---|---|---|---|---|---|---|---|---|---|---|
| | $B_2O_3$ | $SiO_2$ | $Li_2O$ | ZnO | $La_2O_3$ | $Gd_2O_3$ | $Y_2O_3$ | $\Sigma Ln_2O_3$ | $TiO_2$ | $ZrO_2$ | $Ta_2O_5$ | $P_2O_5$ | $Nb_2O_5$ | $WO_3$ | $Bi_2O_3$ |
| Comparative Ex. 1 | 27.48 | 2.10 | 0.52 | 11.09 | 26.74 | 25.32 | | 52.07 | 5.16 | | 1.54 | 0.00 | | | |
| Ex. 25 | 27.47 | 2.10 | 0.51 | 11.08 | 26.73 | 25.31 | | 52.05 | 5.16 | | 1.54 | 0.04 | | | |
| Ex. 26 | 27.46 | 2.10 | 0.50 | 11.08 | 26.72 | 25.31 | | 52.03 | 5.16 | | 1.54 | 0.09 | | | |
| Ex. 27 | 27.42 | 2.09 | 0.52 | 11.06 | 26.68 | 25.27 | | 51.95 | 5.15 | | 1.54 | 0.22 | | | |
| Ex. 28 | 27.36 | 2.09 | 0.52 | 11.04 | 26.63 | 25.21 | | 51.84 | 5.14 | | 1.54 | 0.44 | | | |
| Ex. 29 | 27.30 | 2.08 | 0.52 | 11.01 | 26.57 | 25.16 | | 51.72 | 5.13 | | 1.53 | 0.66 | | | |
| Ex. 30 | 27.33 | 2.09 | 0.35 | 11.03 | 26.60 | 25.19 | | 51.79 | 5.14 | | 1.54 | 0.70 | | | |
| Ex. 31 | 27.34 | 1.96 | 0.76 | 10.17 | 27.60 | 25.97 | | 53.58 | 4.92 | | | 0.41 | | | 0.85 |
| Ex. 32 | 28.03 | 2.18 | 0.76 | 9.43 | 27.51 | 26.62 | | 54.13 | | | 1.60 | 0.41 | 3.47 | | |
| Comparative Ex. 2 | 27.31 | 2.09 | 0.33 | 11.02 | 26.58 | 25.17 | | 51.75 | 5.13 | | 1.53 | 0.79 | | | |
| Comparative Ex. 3 | 27.24 | 2.08 | 0.52 | 10.99 | 26.51 | 25.10 | | 51.61 | 5.12 | | 1.53 | 0.87 | | | |
| Comparative Ex. 4 | 27.12 | 2.07 | 0.52 | 10.94 | 26.39 | 24.99 | | 51.39 | 5.10 | | 1.52 | 1.31 | | | |
| Comparative Ex. 5 | 27.00 | 2.06 | 0.51 | 10.89 | 26.28 | 24.88 | | 51.16 | 5.08 | | 1.52 | 1.73 | | | |

| | Glass composition (mass %) | | | Glass properties | | | Crystal melting temperature (° C.) | | Presence or absence of crystals in the glass |
|---|---|---|---|---|---|---|---|---|---|
| | $Ln_2O_3 + Ta_2O_5 + WO_3 + TiO_2 + Nb_2O_5 + Bi_2O_3$ | $Sb_2O_3$ | ZnO/ $(B_2O_3 + SiO_2)$ | nd | vd | Tg (° C.) | Crystal melting start temperature | Crystal melting peak temperature | |
| Comparative Ex. 1 | 53.61 | 0.04 | 0.375 | 1.77271 | 49.29 | 614 | 1019 | 1046 | o |
| Ex. 25 | 53.59 | 0.04 | 0.375 | 1.77227 | 49.44 | 612 | 1012 | 1042 | o |
| Ex. 26 | 53.57 | 0.04 | 0.375 | 1.77199 | 49.42 | 615 | 1011 | 1038 | o |
| Ex. 27 | 53.49 | 0.04 | 0.375 | 1.77220 | 49.5 | 614 | 1010 | 1037 | o |
| Ex. 28 | 53.37 | 0.04 | 0.375 | 1.77103 | 49.49 | 614 | 1010 | 1031 | o |
| Ex. 29 | 53.26 | 0.04 | 0.375 | 1.76986 | 49.48 | 614 | 1007 | 1024 | o |
| Ex. 30 | 53.32 | 0.04 | 0.375 | 1.76924 | 49.69 | 620 | 998 | 1014 | o |
| Ex. 31 | 54.42 | 0.04 | 0.347 | 1.77350 | 49.02 | 615 | 1033 | 1058 | o |
| Ex. 32 | 59.20 | 0.04 | 0.312 | 1.76915 | 49.31 | 621 | 1035 | 1060 | o |
| Comparative Ex. 2 | 53.29 | 0.04 | 0.375 | 1.76873 | 49.60 | 621 | 997 | 1009 | x |
| Comparative Ex. 3 | 53.14 | 0.04 | 0.375 | | | | many crystals | | |
| Comparative Ex. 4 | 52.91 | 0.04 | 0.375 | | | | many crystals | | |
| Comparative Ex. 5 | 52.68 | 0.04 | 0.375 | | | | Clouding | | |

High quality homogenized molten glass, from which the optical glasses of Examples and Comparative Examples shown in Table 1 and Table 2 were obtained, was made to continuously flow out of a pipe made of platinum alloy. The flowing-out molten glass was dropped from an outlet of the pipe, received with a plurality of preform molds one after another, and shaped into a plurality of spherical preforms by a floating molding process.

From the results shown in Table 1 and Table 2, it can be confirmed that it is possible to decrease the liquidus temperature by addition of P in a trace amount.

In Table 1 and Table 2, "o" indicates that crystals were not confirmed in the preform, and "x" indicates that crystals were confirmed in the preform. An optical microscope was used for observation of presence or absence of crystals, and its observation magnification was set to be 10-100 times. The crystal referred to herein is one that is not vitrified, and also includes one where glass and crystal are mixed. The preforms obtained from the optical glasses of Examples did not have crystals that are observable through the microscope, but were transparent and homogeneous. All of these obtained preforms were not devitrified, and had high weight accuracy.

In contrast, precipitations of crystals were confirmed by observation with the microscope in the preforms obtained from the optical glasses of Comparative Examples 2-5 each having the $P_2O_5$ content of 0.79% or more. In particular, in Comparative Examples 3-5 each having the $P_2O_5$ content of 0.87% or more, many crystals were confirmed. Therefore, their properties could not be measured. Further, in Comparative Example 5 having the $P_2O_5$ content of 1.73%, clouding was observed visually.

From the above results, it was confirmed
that it is possible to decrease the liquidus temperature by addition of P in a trace amount, and
that when the $P_2O_5$ content is 0.79% or more, the homogeneity of the glass is significantly reduced by crystal precipitation.

Further, for glass samples having a $P_2O_5$ content of over 0% but less than 0.79% (the optical glasses of Examples 25 to 30; 30~40 g by weight), the following acceleration test was performed.

After the glass was melted and cooled in the crucible, 5~10 mm thick glass with a diameter of 30~40 mm was prepared. The prepared glass was introduced into a test furnace, left to stand for a predetermined time, and observed for presence or absence of crystals therein with an optical microscope at a magnification of 10 to 100 times. It was left to stand for 1-2 hours. The observed area was a central portion of the glass, excluding the peripheral edge of about 5 mm. In addition, the crystal referred to herein is one that is not vitrified, and also includes one where glass and crystal are mixed. The temperature at which it was left to stand was set to be the outflow temperature (temperature A) where the molten glass flows out in the manufacture of strip articles, etc., which are base materials of a hot preform or a cold process preform, and temperature A minus 10° C. (temperature B). Here, temperature A was set to be, for example, 1040° C. Since temperature B is lower than temperature A, it is a condition that crystals are easily precipitated.

It was glass samples that had a $P_2O_5$ content between 0.04%~0.44% that crystals were not observed after tests at temperature A. Furthermore, it was glass samples that had a $P_2O_5$ content between 0.09%~0.44% that crystals were not observed after tests at temperature B as well. The reason why crystals were pricipitated at temperature A and temperature B when glass samples had a $P_2O_5$ content of over 0.44% appears to be that in this composition range, the easiness with which crystals are precipitated by reaction between P and rare earth elements predominates over the effect from the liquidus temperature decrease. On the other hand, the reason why crystals were precipitated at temperature B when glass samples had a $P_2O_5$ content of less than 0.09% appears to be that the degree of decrease in the liquidus temperature is low in this composition range. In other words, the $P_2O_5$ content of 0.09%~0.44% range is a range that shows a particularly pronounced effect such that the liquidus temperature is lowered and the crystal precipitation can be suppressed. Therefore, the $P_2O_5$ content is preferably over 0% but 0.44% or less, and more preferably 0.09% 0.44%.

The lowering of the crystal melting start temperature and the crystal melting peak temperature when P is contained in a trace amount as demonstrated in Examples shows a remarkable effect in that it is possible to lower the molding temperature of the glass or the outflow temperature of the molten glass. If it is possible to lower the molding temperature of the glass, the viscosity of the molten glass is increased. If the viscosity of the molten glass is increased, the generation of striae and change in optical properties can be suppressed. Also, it is possible to prevent coloring that occurs due to contamination from the crucible material. Furthermore, because optical glass that has a low liquidus temperature can be made to flow out at a low temperatures, it is possible to lower the temperature where the molten glass flows out. By lowering the temperature here, it is possible to prevent the precipitation of crystals when a preform is manufactured by hot molding or when a strip article of a base material of a cold process preform is manufactured.

From optical glasses of Examples, a preform was prepared by using the descent-cutting method instead of the dropping method. Likewise, devitrification was not observed, either, in the preform obtained by the descent-cutting method and the obtained preform was of high weight accuracy. Also, in both the dropping method and the descent-cutting method, no cutting marks were observed in the preform. As with a pipe made of platinum alloy, even when a pipe made of platinum was used, the pipe was not damaged by the outflow of the molten glass.

2. Example Relating to an Optical Element

An aspherical lens was obtained by aspherical precision press-molding a preform obtained in Example described above using precision press-molding apparatus. The obtained aspherical lens was an extremely precise lens and it had a refractive index nd and an Abbe number vd as shown in Table 1 and Table 2.

By designing the cavity of the mold in a predetermined shape, other optical components such as a spherical lens and the like can also be prepared by the precision press molding in the same manner.

Finally, the above-mentioned respective aspects will be summarized hereinafter.

According to one aspect, borate based optical glass comprises, in a glass composition based on oxides, $B_2O_3$ content of 20 to 40 weight %, and the total content of the rare earth oxide and an oxide selected from the group consisting of $Ta_2O_5$, $WO_3$, $TiO_2$, $Nb_2O_5$ and $Bi_2O_3$ being in the range of 35 to 70 weight % (glass A), or a rare earth oxide of 35 to 60 weight %, wherein $P_2O_5$ is contained in the range of over 0 weight % and less than 0.79 weight %, thereby providing an optical glass that can exhibit a low liquidus temperature as compared with when it is not contained. The optical glass showing a low liquidus temperature is suitable for production of a hot-molded article.

Additionally, the above-mentioned optical glass has a high refractive index and low dispersion characteristics wherein a refractive index nd is in the range of 1.72 to 1.83 and an Abbe number vd is in the range of 45 to 55, and a glass transition temperature Tg of 640° C. or less. Accordingly, the optical glass is suitable for precision press molding.

The above-mentioned optical glass can contain ZnO content 2~25 weight %. Also, the above-mentioned optical glass can contain an alkali metal oxide content of 0~10 weight %. Since ZnO and alkali metal oxide are components having an effect of lowering the glass transition temperature, it is preferred to introduce one or both in the above optical glass.

Further, according to another aspect, a hot-molded article comprising the above optical glass is provided.

Also, according to another aspect, a method of manufacturing a hot-molded article comprising a step of obtaining a molded article by hot molding the above optical glass is provided.

Since the above optical glass has a glass transition temperature which is suitable for precision press molding, the above hot-molded article can be a preform for precision press molding.

According to yet another aspect, an optical element comprising the above optical glass is also provided.

According to yet another aspect, a method of manufacturing an optical element including a step of obtaining an optical element by precision press-molding the above hot molded article is also provided. Since a hot-molded article which is comprised of the above optical glass having a relatively low glass transition temperature less than 640° C. can be pressed at a relatively low temperature, it is suitable for precision press molding.

According to yet another aspect, an optical glass comprising $P_2O_5$, $B_2O_3$, and a rare earth oxide as essential components, wherein in a glass composition based on oxides,
$P_2O_5$ content is in the range of over 0 weight % and less than 0.79 weight %,
ZnO content is in the range of 2~25 weight %
$B_2O_3$ content is in the range of 20 to 40 weight %, and
the total content of the rare earth oxide and an oxide selected from the group consisting of $Ta_2O_5$, $WO_3$, $TiO_2$, $Nb_2O_5$ and $Bi_2O_3$ is in the range of 35 to 70 weight %,
the optical glass having
a refractive index nd of 1.72 to 1.83, and
an Abbe number vd of 45 to 55; and
an optical glass comprising, in a glass composition based on oxides,
over 0 but less than 0.79 weight % of $P_2O_5$,
2 to 25 weight % of ZnO
20 to 40 weight % of $B_2O_3$, and
35 to 60 weight % of a rare earth oxide,
the optical glass having
a refractive index nd of 1.72 to 1.83, and
an Abbe number vd of 45 to 55,
are also provided.

Furthermore, another aspect relates to, an optical glass comprising $P_2O_5$, $B_2O_3$, and a rare earth oxide as essential components, wherein
$P_2O_5$ content is in the range of over 0 weight % and less than 0.44 weight %,
$B_2O_3$ content is in the range of 20 to 40 weight %, and
the total content of the rare earth oxide and an oxide selected from the group consisting of $Ta_2O_5$, $WO_3$, $TiO_2$, $Nb_2O_5$ and $Bi_2O_3$ is in the range of 35 to 70 weight %,
the optical glass having
a refractive index nd of 1.72 to 1.83, and
an Abbe number vd of 45 to 55; and
an optical glass comprising, in a glass composition based on oxides,
over 0 but less than 0.44 weight % of $P_2O_5$,
20 to 40 weight % of $B_2O_3$, and
35 to 60 weight % of a rare earth oxide,
the optical glass having
a refractive index nd of 1.72 to 1.83, and
an Abbe number vd of 45 to 55.

For details of the optical glass of the above aspects, it is possible to refer to the description of the optical glass described above.

It is to be understood that the aspects of embodiments disclosed herein are not restrictive but illustrative in all respects. The scope of the present invention is defined by the appended claims rather than by the foregoing description and is intended to include the meaning equivalent to the scope of the claims and any modifications within the scope.

INDUSTRIAL APPLICABILITY

The present invention is useful in the field of manufacturing glass optical elements such as lenses and the like.

What is claimed is:

1. An optical glass comprising $P_2O_5$, $B_2O_3$, and a rare earth oxide as essential components, wherein in a glass composition based on oxides,
$P_2O_5$ content is in the range of over 0 weight % and less than 0.79 weight %,
$B_2O_3$ content is in the range of 20 to 40 weight %, and
the total content of the rare earth oxide and an oxide selected from the group consisting of $Ta_2O_5$, $WO_3$, $TiO_2$, $Nb_2O_5$ and $Bi_2O_3$ is in the range of 35 to 70 weight %,
the optical glass having
a refractive index nd of 1.72 to 1.83,
an Abbe number vd of 45 to 55, and
an optical glass transition temperature Tg of 640° C. or less.

2. An optical glass comprising, in a glass composition based on oxides,
over 0 but less than 0.79 weight % of $P_2O_5$,
20 to 40 weight % of $B_2O_3$, and
35 to 60 weight % of a rare earth oxide,
the optical glass having
a refractive index nd of 1.72 to 1.83,
an Abbe number vd of 45 to 55, and
an optical glass transition temperature Tg of 640° C. or less.

3. The optical glass according to claim 1, which contains a ZnO content of 2 to 25 weight %.

4. The optical glass according to claim 1, which contains an alkali metal oxide content of 0-10 weight %.

5. The optical glass according to claim 1, wherein the glass is subjected to hot molding.

6. A hot-molded article which is comprised of the optical glass according to claim 1.

7. The hot-molded article according to claim 6, which is a preform for precision press molding.

8. An optical element which is comprised of the optical glass according to claim 1.

9. A method of manufacturing a hot-molded article comprising a step of obtaining a molded article by hot molding the optical glass according to claim 1.

10. A method of manufacturing an optical element comprising a step of obtaining an optical element by precision press-molding the hot-molded article according to claim 7.

11. The optical glass transition according to claim 1, wherein the optical glass transition temperature Tg is 630° C. or less.

12. The optical glass transition according to claim 1, wherein the optical glass transition temperature Tg is 625° C. or less.

13. The optical glass transition according to claim 1, wherein the optical glass transition temperature Tg is 620° C. or less.

* * * * *